Feb. 7, 1939.  L. E. BAKER  2,146,105
METHOD AND DEVICE FOR HANDLING AND CONSERVATION OF FISH AND THE LIKE
Filed April 7, 1936  2 Sheets-Sheet 1

INVENTOR.
LIN E. BAKER
BY George B. White
ATTORNEY.

Feb. 7, 1939.    L. E. BAKER    2,146,105
METHOD AND DEVICE FOR HANDLING AND CONSERVATION OF FISH AND THE LIKE
Filed April 7, 1936    2 Sheets-Sheet 2
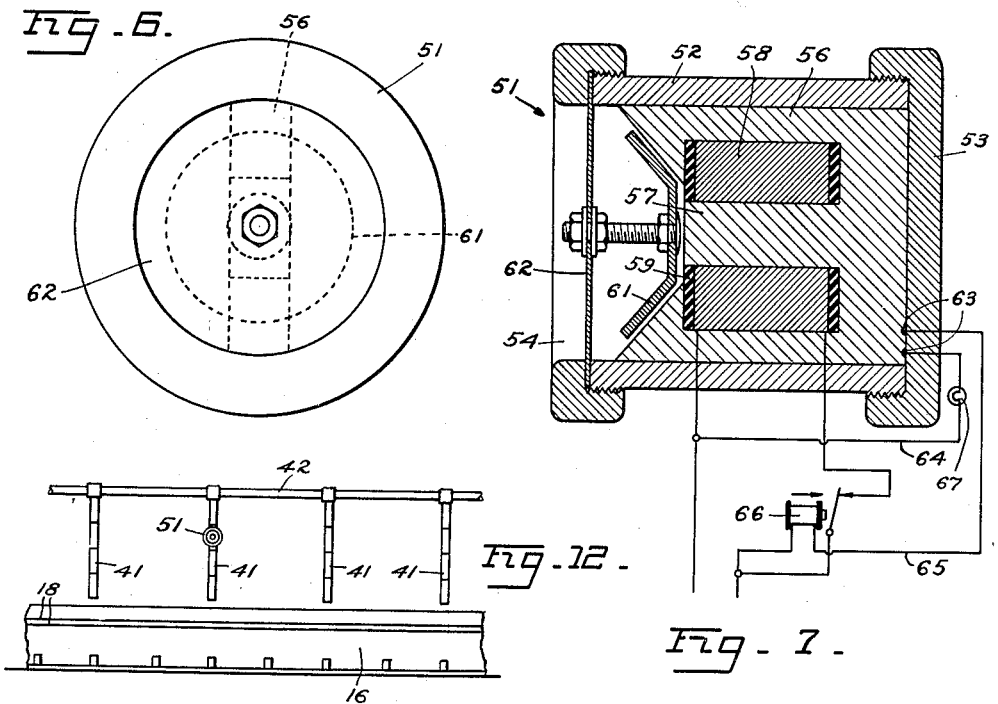
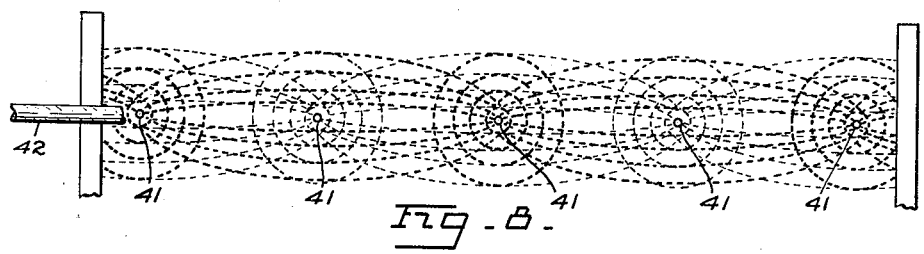
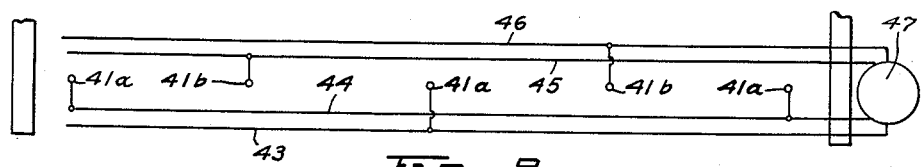
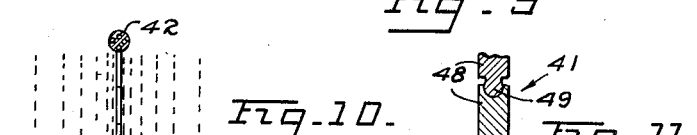
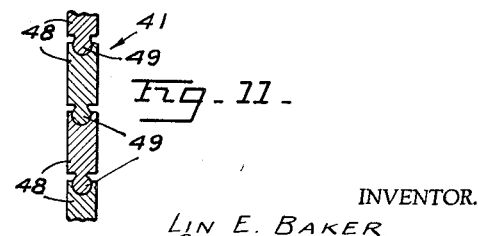
INVENTOR.
LIN E. BAKER.
BY George B. White
ATTORNEY.

Patented Feb. 7, 1939

2,146,105

UNITED STATES PATENT OFFICE 2,146,105

METHOD AND DEVICE FOR HANDLING AND CONSERVATION OF FISH AND THE LIKE

Lin E. Baker, San Francisco, Calif.

Application April 7, 1936, Serial No. 73,113

9 Claims. (Cl. 175—265)

This invention relates to a method and device for handling and conservation of fish and the like.

An object of the invention is to provide a method whereby interrupted electric current, of such strength and frequency as not to paralyze or kill fish and the like can be utilized to restrict the movement or swimming of said fish and the like either within or outside of certain bounded areas or bodies of water.

Another object of the invention is the provision of a method whereby a warning with which fish or the like may become familiar can be combined with a warning with which the same are not familiar, namely with interrupted electric current of limited strength and frequency, to prevent or direct fish and the like in a body of water.

Another object of the invention is to provide a barrier formed of electric field in a body of water for the handling and conservation of swimming or crawling animal life under water.

Another object of this invention is to provide a method and device for handling and conservation of fish and the like which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description and specifically pointed out in the appended claims, reference is had to the accompanying drawings for the illustrative embodiment of the invention, wherein:

Figure 6 is the front view of a sound, vibration box used in connection with the barriers.

Figure 7 is a sectional view of said sound vibration box and a diagram of its electric connections.

Figure 8 is a top plan view of a horizontal barrier, and a diagram of its overlapping fields.

Figure 9 is a diagrammatic view of the electric connections of the barrier shown in Figure 8.

Figure 10 is a sectional view of the barrier shown in Figure 8, and its electric field.

Figure 11 is a fragmental, sectional detail view of an electrode from the barrier shown in Fig. 10, and Figure 12 is a somewhat diagrammatic view of a combined horizontal and vertical barrier.

Figures 1, 2:
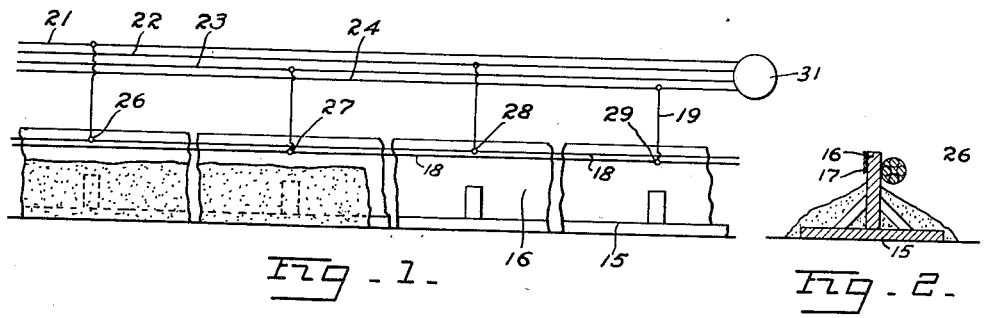
Figure 1 is a somewhat diagrammatic view of a vertical barrier against crawling animals only.
Figure 2 is a sectional view of the barrier shown in Figure 1.

Every year a large number of game fish and fry die because they have followed some irrigation canal instead of the main stream channel. Others are killed by mechanical injury or sudden pressure change incident to passing through hydraulic power plants. Many oyster beds are damaged and millions of oysters perish because of the starfish, and oyster borer and the like. Artificial stream barriers, or water barriers, such as mechanical screens proved impractical in view of their action practically as a dam. Electric screens heretofore used were either too weak to be effective, or so strong as to paralyze and kill the fish.

In my method I create an electrified zone in the water localized to the path where handling or restriction is required, and the field is interrupted at a frequency which does not damage the fish yet gives sufficient shocks to prevent their passing through the barrier.

The interruption between shocks is for a period which is not long enough to allow the fish to pass through the barrier. The electric current flow is such as to pass through the fleshy part of the animal in any position at the largest surface exposed.

For instance, in connection with starfish, the field is vertical so as to pass lengthwise through the ambulacral tubes of the starfish. In practice the starfish makes ineffective attempts to turn so as to receive the current at right angles of the tubes and then turns away from the barrier.

In connection with swimming fish the field is substantially horizontal in direction and has a plurality of overlapping, alternately operative fields so as not to provide any too narrow field for passage anywhere.

The vertical and horizontal field arrangements may be combined if circumstances so require.

To provide advance warning to fish or the like, in connection with stationary barriers, in addition to the electric current vibration, which shocks the fish, a warning oscillation within the lower frequency of sound waves is created so as to travel towards the approaching fish. The warning sound waves do not shock or injure the fish, but are sensed and felt by them. Experience shows that the repeated succession of such sound waves by an electric shock as the fish proceeds to the barrier has a tendency, after extended use of the combination barrier, to cause directing or diverting of the fish by the sound alone, so that after extended use the fish may be turned around and directed away frequently without ever reaching the electric zone and without receiving any electric shock.

In carrying out my invention I make use of either vertical fields, between parallel, horizontal conductors, as illustrated in Figures 1 to 4 inclusive; or horizontal fields between vertical conductors, as illustrated in Figures 5, 8, 9, and 10, or the two types of fields may be combined with each other, or with the sound device shown in Figures 6 and 7.

The embodiment of this invention illustrated in Figures 1 to 4 inclusive is particularly adapted for the conservation of oyster and the protection of oyster beds against its crawling enemies, such as starfish, or oyster borer, which always float or crawl near the bottom. A long board 15 preferably made of wood, is placed along the bottom at a border of an oyster bed in vertical position extending to a limited height. A plurality of braced standards 16 extend from said board 15 at spaced points horizontally and at right angles. Along one face of the board 16 is an insulating shield 17, on which in turn are mounted horizontal conductor electrodes 18. Alternate electrodes 18 preferably partially insulated to secure even current distribution are connected by lead line 19 to one of four wires 21, 22, 23, and 24, which latter are preferably arranged in a cable 26 which in turn is laid alongside the other side of the board 16. Thus the whole unit or barrier is limited to a space near the bottom only, so as to leave the layer of water above the device free. The alternate connection of the electrodes 18 is such, that one electrode is connected to wire 21, at a point 26, the other electrode 18 at the next succeeding spaced point 27 is connected to wire 23, the first electrode 18 at a third spaced point 28 in order is connected to the wire 22, and the second electrode 18 at a fourth spaced point 29 in order is connected to the wire 24. Thus when current is passed through wires 21 and 22 field is formed around the electrodes 18 at said first and third spaced points 26 and 28 in order, and when current passes through the other two wires 23 and 24 then field is formed around the electrodes 18 at said second and fourth spaced points 27 and 29. The current is alternately connected to the pairs of wires 21 and 22, and 23 and 24 by means of a suitable synchronized commutator, or mercury switch or interrupter indicated at 31.

The braced standards 16 and lower portion of the board 15 are covered with sand at the bottom so as to cause the starfish and the like to crawl or float toward the alternately charged electrodes 18.

Figures 3, 4:
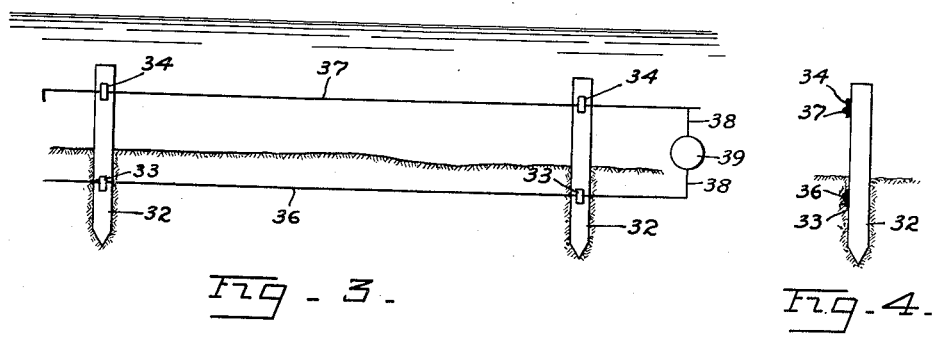
Figure 3 is a somewhat diagrammatic view of a modified form of a barrier near the bottom of a body of water.
Figure 4 is a sectional view of the barrier shown in Figure 3.

The embodiment shown in Figures 3 and 4 includes a plurality of spaced posts 32, on each of which are provided vertically spaced and aligned insulating shields 33 and 34. On the lower shields 33 is mounted a horizontal electrode 36 buried in the ground along the bottom. On the upper shields is mounted another horizontal electrode 37. In practice a distance of two feet between the electrodes 36 and 37 was the most efficient in connection with oyster beds. The upper electrode 37 has the primary function to complete the circuit, and also a field is formed between the said electrodes 36 and 37 providing a very effective barrier near the bottom. The electrodes 36 and 37 are connected by means of insulated conductors 38 to a suitable synchronized commutator, or mercury switch or interrupter indicated at 39, thereby to effect synchronized interrupted charges and fields.

In the above form the lines of the field in the electrified zone around and between the electrodes are substantially vertical so as to pass through the ambulacral tubes of a starfish, or the equivalent organs of other animals, lengthwise, which is the most effective.

In the embodiments shown in Figures 5, 8, 9, and 10 the lines of the field in the electrified zone around and between the electrodes are substantially horizontal so as to pass through a fish or the like swimming animal as nearly lengthwise as possible in any position.

Figure 5:
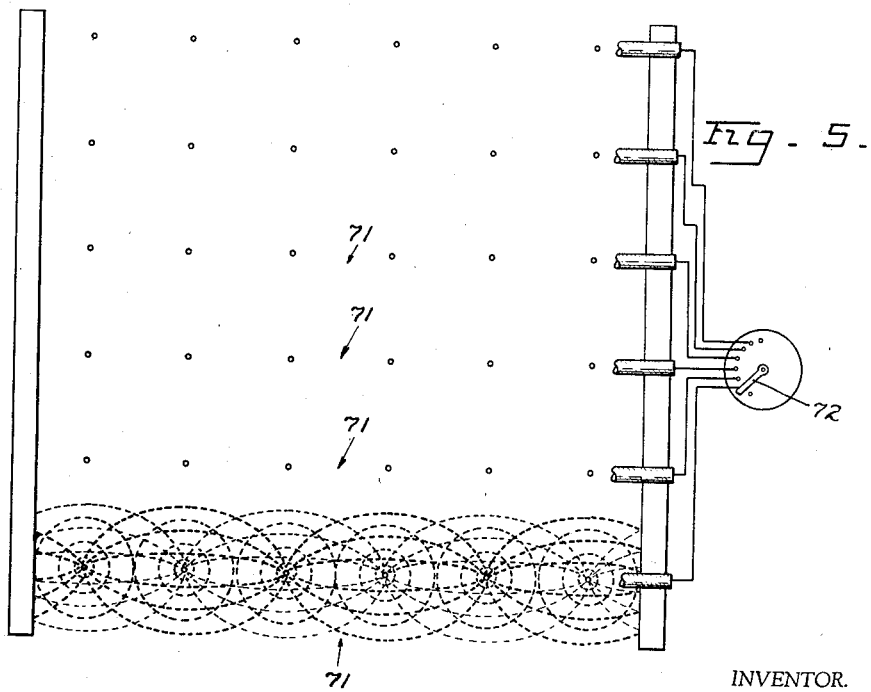
Figure 5 is a somewhat diagrammatic view of the use of a moving barrier field.

In these embodiments a plurality of parallel vertical electrodes 41 are arranged in the water from the surface toward the bottom, preferably in a row across the usual path of fish or the like, or across a stream or the inlet of an irrigation canal, or of hydraulic power plant, and the like. In the herein illustration the electrodes 41 are in the form of rods suspended from an overhead cable 42. The cable 32 contains the desired number of wires for conducting electric current to the electrodes 41. In this illustration in Figures 8 to 10 there are four conductor wires 43, 44, 45, and 46. The pair of wires 43 and 44 are alternately connected to electrodes marked 41a, namely every other electrode of the series. The conductor wires 45 and 46 are alternately connected to electrodes marked 41b. An electrode 41b is located substantially intermediately between each pair of electrodes 41a. In Figures 5 and 8 the lines of the charged field between the electrodes 41a are indicated in heavier lines, and the lines between the electrodes 41b in lighter, broken lines. The fields or zones formed between the electrodes 41a overlap to the middle of the respective fields or zones formed between the electrodes 41b and vice versa.

It is to be noted that the cable is preferably stretched and supported above the surface of the water, and extends between supports, such as the banks of a stream, or other supports either anchored or resting on the bottom. The wires 43, 44, 45, and 46 are connected to a synchronized commutator, or mercury switch, or interrupter as indicated at 47 which latter is so adjusted as to alternately connect and disconnect the respective pairs of wires 43 and 44, and 45 and 46 to a source of electricity. The adjustment of the interrupter is such that when the flow of current ceases through one pair of wires, then the circuit is complete through the other pair of wires and vice versa, and the time of current flow at each time is of comparatively short duration to provide a shock without injury to the fish, but the intervals are not long enough to allow fish to swim through the barriers thus formed. It is to be noted also that by reason of the overlapping alternately operative electric fields, the overall width of the field is of a substantially uniform width and the lines of force at different angles pass through a comparatively large portion of the body of a fish even if the fish swims at right angles to the barrier. The electrified zone may be further widened by providing more than two overlapping and alternately operative fields. For instance every third electrode 41 may be connected to a different circuit so as to provide three circuits through three pairs of conductors. The spacing of the electrodes 41 would remain practically the same but the overlapping, alternating fields will be wider as there are more intervening electrodes 41 between a pair of coacting electrodes. For instance in case of three circuits there would be two intervening electrodes 41 between each pair of coacting electrodes 41, in case of four circuits there will be three intervening electrodes 41 between each pair of coacting electrodes 41 and so on, and the result is a corresponding number of overlapping alternately operative fields, because the interrupter in each case is so adjusted that the overlapping fields operate in succession and not simultaneously. In other words the distance between electrodes of different polarity and of the same circuit determines the spread of the electric field or zone of the barrier in width, and also the number of overlapping fields. The commutator, or interrupter 47 is set for a predetermined frequency, or in case of alternating current so as to work on one cycle, or a given number of cycles of said alternating current.

The electrodes 41 are made flexible so that each can bend and give when a large or bulky floating object abuts against it. An embodiment of such electrode 41 is shown in Figure 11. A plurality of conductor bars or sections 48 are connected in series by ball and socket joints 49 of the usual type.

The oscillatory device for producing directed vibration within the lower frequency of sound waves, is illustrated herein as a sound box 51. There may be one or more such sound boxes 51 used on a barrier depending on the length of the barrier. As shown in Figure 10 the sound box 51 may be mounted on an electrode 41 at about half way up from the bottom. The herein illustration of such sound box includes a preferably cylindrical casing 52, a closed end 53 of which is suitably mounted on a section 48 of the electrode 41 so that the other or open end 54 faces away from the barrier and toward the approaching fish. In the casing 52 is a steel magnet, preferably made as a laminated closed circuit silicon steel magnet 56, on the central projection 57 of which is provided a magnetic coil 58 between fiber bushings 59. The end of the magnet 56 adjacent the open end 54 of the casing is in concave frustoconical form as shown. An armature 61 is disposed in the concave end of the magnet so as to conform to the shape of the latter. A diaphragm 62, preferably of phosphor bronze, is secured at its outer periphery onto the open end 54 of said casing 52 and covers said end. The armature 61 is centrally supported on the diaphragm 62, so that when the magnet is energized and de-energized at a desired frequency the movement of the armature 61 vibrates the diaphragm 62, which latter imparts a sound wave vibration to the water in the direction wherein the diaphragm is faced. In order to prevent accidental burning out of the coils, and render the under-water operation of the sound box 51 safe, a leak indicator 63 is provided at a suitable point in the casing 52. The leak indicator herein consists of two contacts connected by lines 64 and 65 in parallel with the circuit of the coil 58.

A relay switch 66 has its magnetic coil connected in series with the contact line 65, and its circuitbreaker connected in series with the circuit of the coil 58. Thus whenever water seeping into the casing 52 closes the circuit between the leak indicator contacts 63, the relay switch 66 breaks the electric circuit of the coil 58. Normally said switch 66 is closed. In addition a lamp, or bell, or other suitable signal 67 is connected between the leak indicator contacts 63 to be rendered operative when water shunts the circuit. Of course this safety device is only for emergency because the casing 52 is preferably sealed and waterproof all around.

In the event it is necessary to allow fish to swim and pass one way but to prevent passage in the opposite direction a moving field is used in the manner illustrated in Figure 5. This consists of a plurality of spaced sets or rows 71 of electrodes, of the type shown and described in connection with Figure 8. There are as many sets or rows 71 arranged in a channel or stream as necessary, depending on the type and size of fish. Each set operates individually as heretofore described. A suitable revolving switch 72 of the usual series interrupter type, is so connected to each set, as to render the rows 71 successively operative in one direction. Namely, the electric circuit is closed and changed instantaneously row after row successively, rendering each row 71 operative for a comparatively short period only, so that there is only one operative row 71 at any one time. In effect the electric field or zone travels or moves from electrode row 71 to the next row 71, for instance in a stream, from the upstream end to the downstream end of the unit. But the switch is so adjusted that after the electric field reaches the downstream end it changes it by a single jump to the upstream end of the unit. This return jump of the field is from the last row 71 of the series to the first row 71 without creating any fields in between. Thus fish that followed the electric field down stream are now urged out of said unit further downstream by the next gradual downstream travel of said electric field and the fish is prevented to travel upstream and is urged downstream. The switch 72 is made reversible so as to drive fish upstream instead of downstream, if desired.

In the above devices the electric impulses, and especially the length of said impulses depend on the amperage. The greater the amperage the shorter the impulse. In actual practice heretofore the most efficient number of impulses for vertebrates were from eight to twenty impulses per second, and for invertebrates one impulse per second or less, depending on the sensitivity of the fish. A satisfactory length of impulse, for instance, for starfish was 1/100 second with one second lapse between impulses. But the current used for starfish is much too strong both in duration of impulse and amperage to be used on vertebrates. Hence if it is necessary to protect against both vertebrates and invertebrates, as in the case of protecting an oyster bed from both starfish and gar-fish it is necessary to use a combination field, namely a low frequency, e. g. one impulse per second, in vertical field, and above it a higher frequency, e. g. eight to twenty impulses per second, in a horizontal field, with different amperage. The amperage, or current of course must be determined also according to the water in which the barrier is used. For instance due to the low resistance of ocean water, or salt water, a stronger field and more current is required for an electric barrier therein, than fresh water where the resistance is much higher.

Having thus described my invention what I claim and desire to secure by Letters Patent is:

1. A method for forming an electric barrier in water which consists in creating an electrified zone by a row of overlapping independent but alternately operative electric fields and by alternately interrupting the respective electric fields, said zones being arranged to block the path of the fish, the most effective portion of one zone being adjacent the weakest portion of the adjacent zones.

2. A method for forming an electric barrier in water which consists in creating a series of alternately operative electrified fields in substantially the same plane forming said barrier.

3. A method for forming an electric barrier in water which consists in creating a series of alternately operative electrified fields in a line forming said barrier, and interrupting the electric charge of the respective fields at a frequency to shock fish reaching said barrier but not to paralyze or kill the fish.

4. A method of directing fish and the like comprising the creating of an electrified zone in the water with interrupted electric charges, and the directing of vibration in the water within the lower frequencies of sound waves in a direction from which fish or the like approach said barrier.

5. A method of forming an electric barrier for fish which consists in creating an electrified zone in the water by forming contiguous electric fields between electrodes extending the full height of the barrier so that the lines of the fields overlap each other and the lines of one field diverge horizontally at areas where the lines of the respective overlapping field converge horizontally, and alternately rendering said overlapping fields operative and inoperative at predetermined time intervals.

6. An electric barrier for the handling or directing fish and the like comprising a plurality of electrodes at the bottom of a body of water so arranged that the main lines of the electric field formed around and between said electrodes are substantially vertical, a set of electrodes extended downwardly in the water toward said plurality of electrodes and being so arranged that lines of the field formed around and between said set of electrodes are substantially horizontal, means to impart interrupted electric flow to said plurality of electrodes at a predetermined frequency, and means to impart interrupted electric flow to said set of electrodes at different frequency from that imparted by said first means.

7. An electric barrier for directing fish comprising, means to create an electrified zone interrupted at predetermined frequency near the bottom of a body of water, means to create a separate electrified zone above the first zone being interrupted at a different predetermined frequency, and means related to said second zone to impart to the water a directed vibration within the lower frequency of sound waves.

8. An electric barrier for directing fish and the like comprising a plurality of spaced electrodes extended into a body of water, means to create an interrupted flow of electric current to said electrodes, so as to create an electrified field around and between said electrodes, the lines of said field being substantially horizontal, and means related to said field in said water to create a directed sound vibration within the lower sound frequencies.

9. An electric barrier for directing fish in a body of water, comprising a plurality of electrodes extended into the water so that the lines of the electric fields formed around and between the respective electrodes are substantially parallel with the surface of the water, means to connect said electrodes to a source of electricity so that the fields formed between any one pair of electrodes longitudinally overlap the fields formed by pairs of adjacent electrodes, and an interrupter device to alternately render the electrodes of overlapping fields operative.

LIN E. BAKER.